Figure 1:
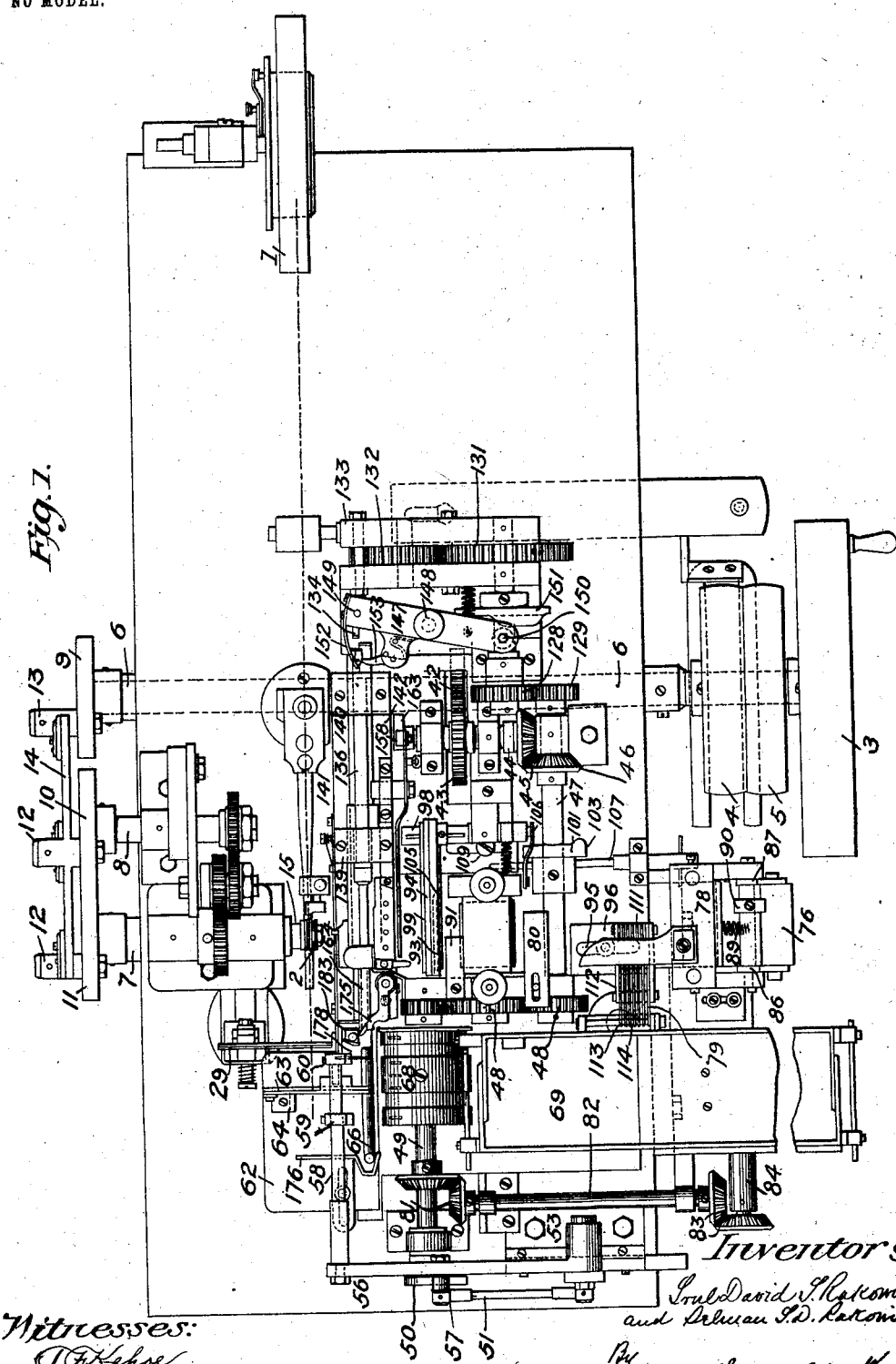

No. 721,087. PATENTED FEB. 17, 1903.
S. D. S. & S. S. D. RAKOWITZKY.
MACHINE FOR MAKING CIGARETTE WRAPPERS WITH MOUTHPIECES.
APPLICATION FILED APR. 1, 1902.
NO MODEL. 6 SHEETS—SHEET 1.

Witnesses:
T. F. Kehoe
W. H. Kennedy

Inventors:
Srul David S. Rakowitzky
and Selman S. D. Rakowitzky
By Philipp Sawyer Rice & Kennedy
Attorneys.

No. 721,087. PATENTED FEB. 17, 1903.
S. D. S. & S. S. D. RAKOWITZKY.
MACHINE FOR MAKING CIGARETTE WRAPPERS WITH MOUTHPIECES.
APPLICATION FILED APR. 1, 1902.
NO MODEL. 6 SHEETS—SHEET 2.
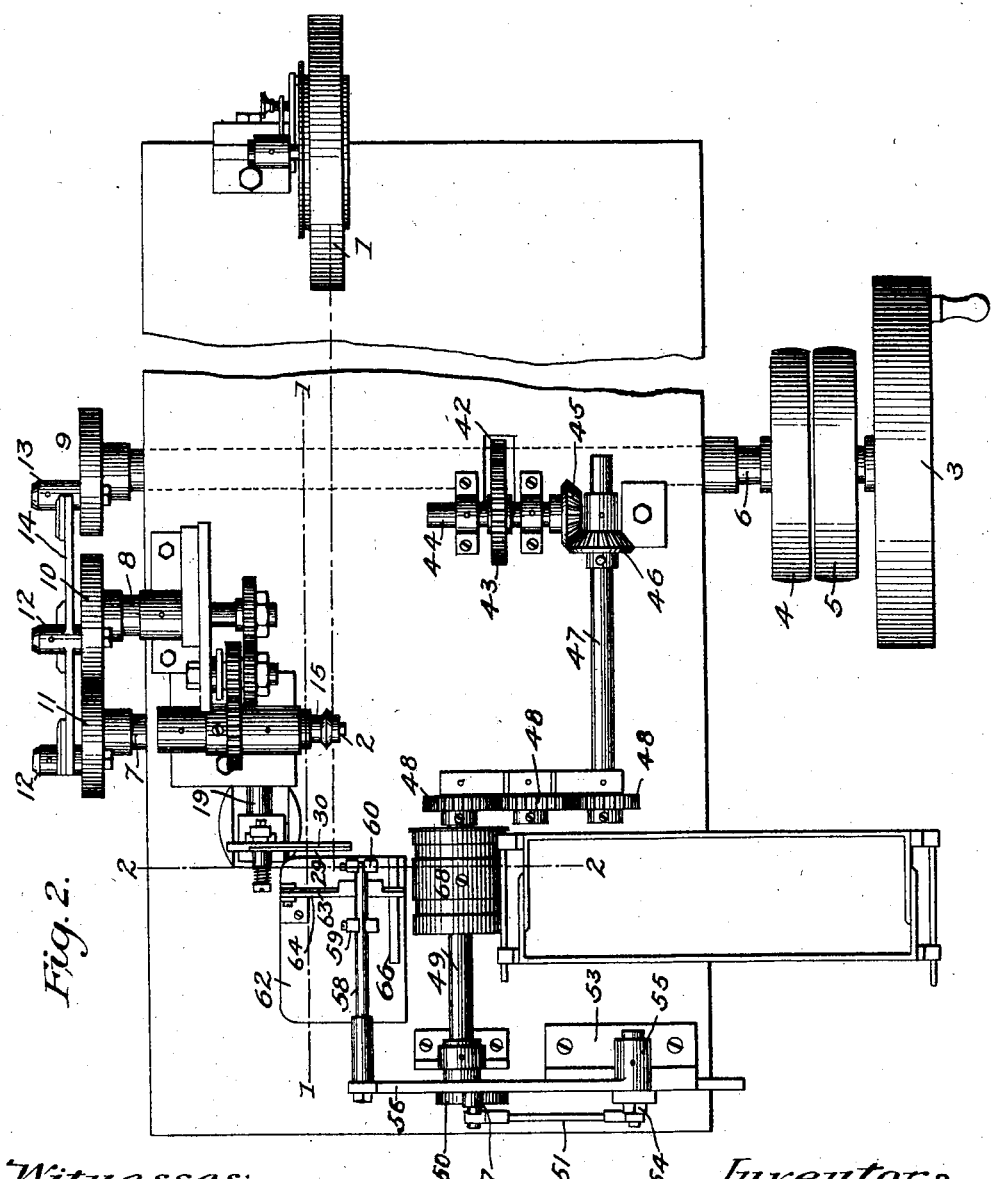

No. 721,087. PATENTED FEB. 17, 1903.
S. D. S. & S. S. D. RAKOWITZKY.
MACHINE FOR MAKING CIGARETTE WRAPPERS WITH MOUTHPIECES.
APPLICATION FILED APR. 1, 1902.
NO MODEL. 6 SHEETS—SHEET 3.
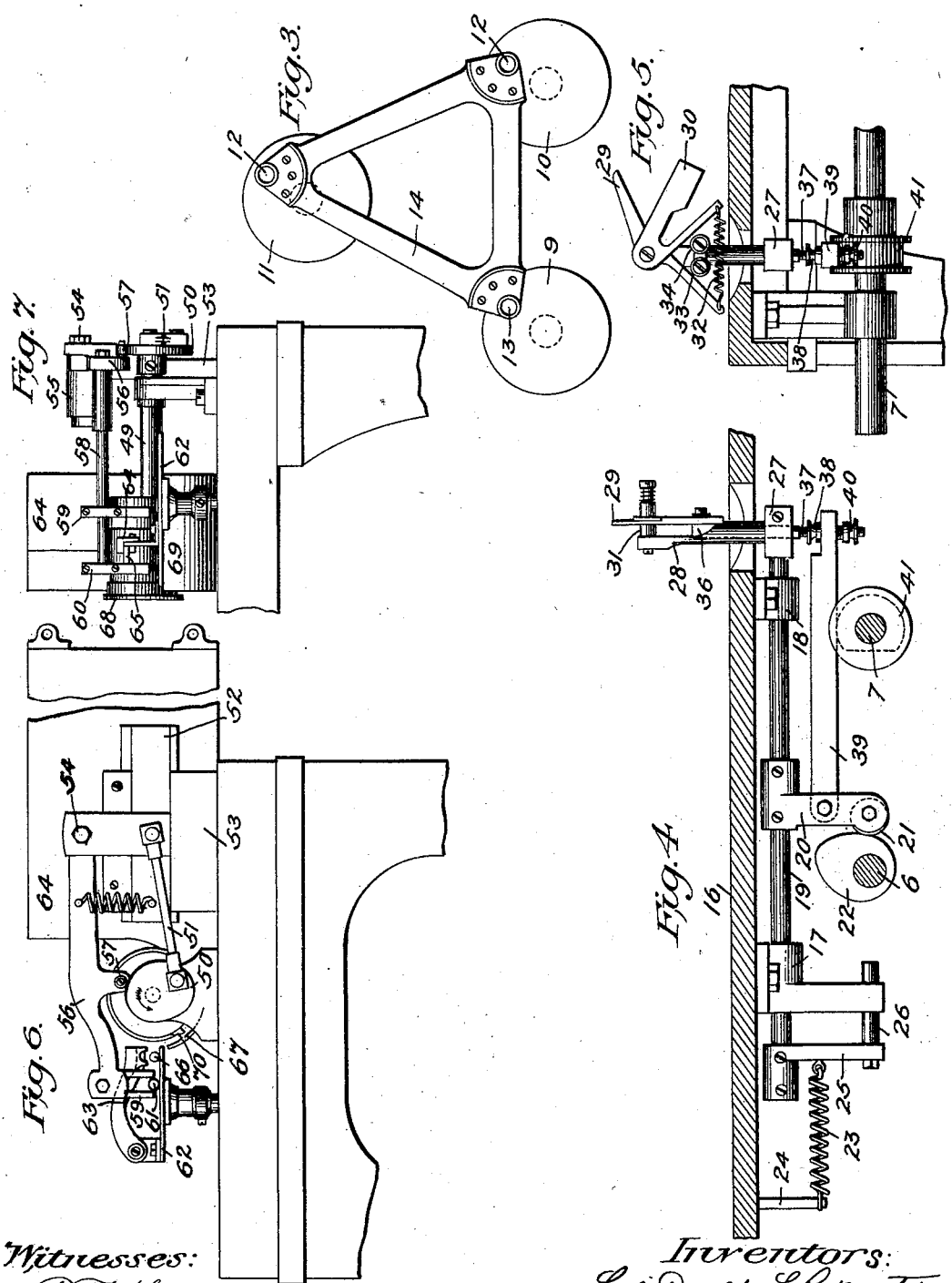

No. 721,087. PATENTED FEB. 17, 1903.
S. D. S. & S. S. D. RAKOWITZKY.
MACHINE FOR MAKING CIGARETTE WRAPPERS WITH MOUTHPIECES.
APPLICATION FILED APR. 1, 1902.
NO MODEL. 6 SHEETS—SHEET 4.
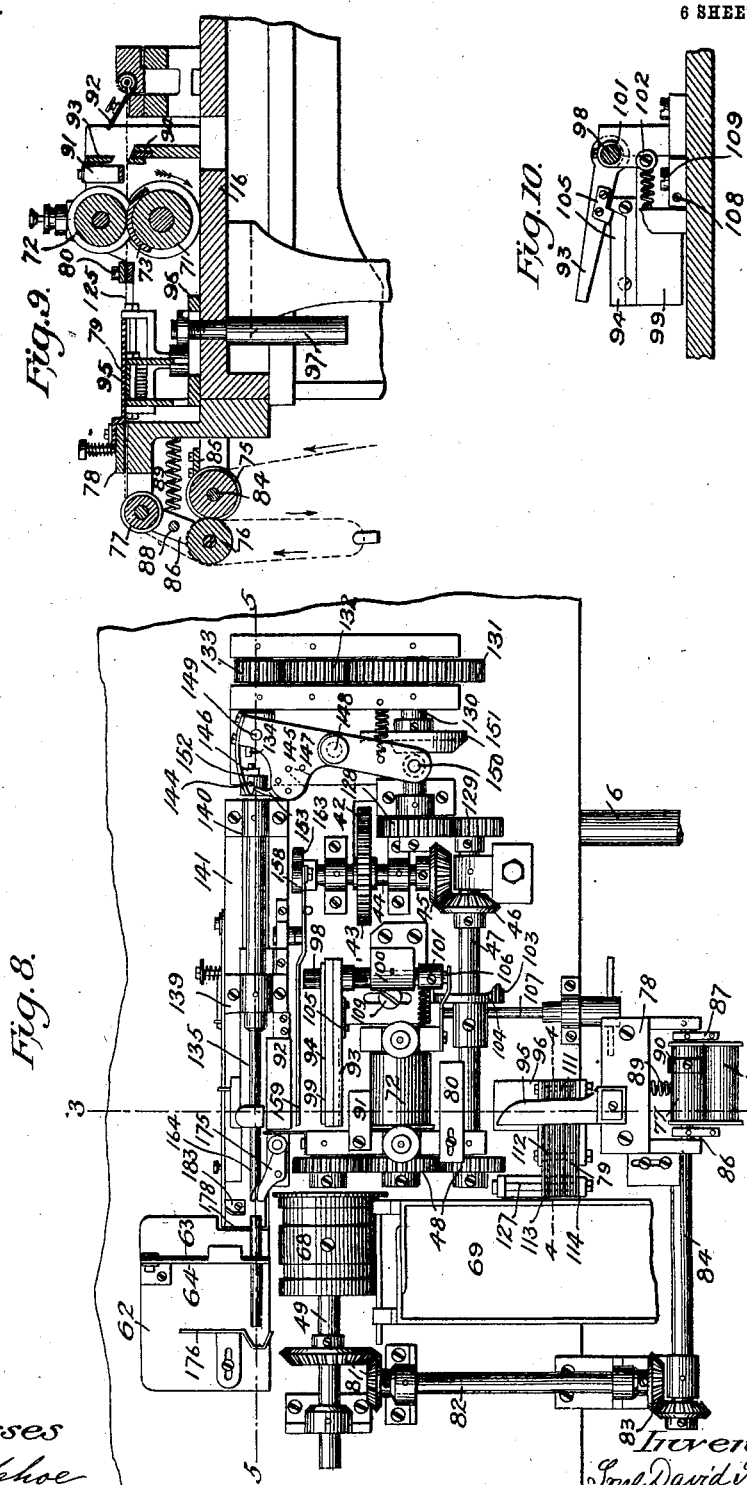

No. 721,087. PATENTED FEB. 17, 1903.
S. D. S. & S. S. D. RAKOWITZKY.
MACHINE FOR MAKING CIGARETTE WRAPPERS WITH MOUTHPIECES.
APPLICATION FILED APR. 1, 1902.
NO MODEL. 6 SHEETS—SHEET 5.
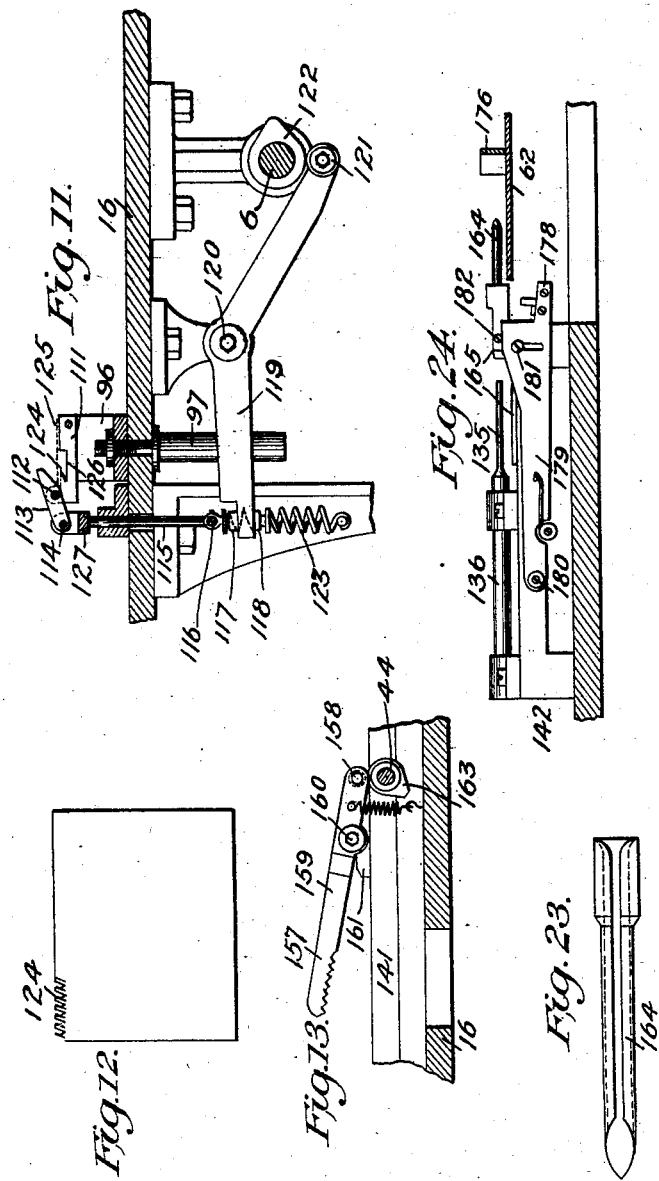

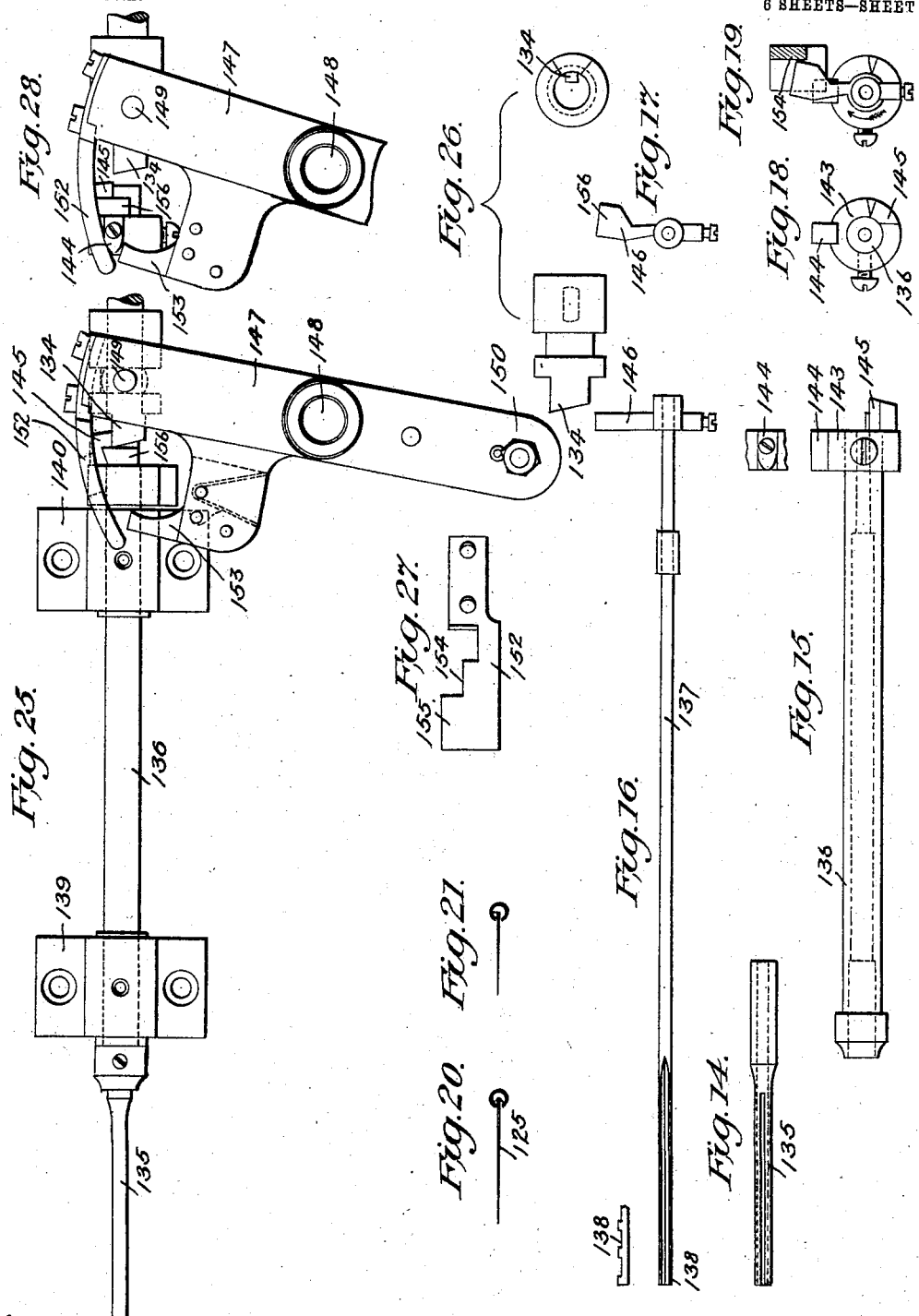

UNITED STATES PATENT OFFICE.

SRUL DAVID S. RAKOWITZKY AND SELMAN S. D. RAKOWITZKY, OF VILNA, RUSSIA, ASSIGNORS, BY MESNE ASSIGNMENTS, TO THE AMERICAN TOBACCO COMPANY, OF NEW YORK, N. Y., A CORPORATION OF NEW JERSEY.

MACHINE FOR MAKING CIGARETTE-WRAPPERS WITH MOUTHPIECES.

SPECIFICATION forming part of Letters Patent No. 721,087, dated February 17, 1903.

Application filed April 1, 1902. Serial No. 100,900. (No model.)

*To all whom it may concern:*

Be it known that we, SRUL DAVID S. RAKOWITZKY and SELMAN S. D. RAKOWITZKY, subjects of the Emperor of Russia, residing in Vilna, Russia, have invented certain new and useful Improvements in Machines for Making Cigarette-Wrappers with Mouthpieces, of which the following is a full, clear, and exact description, reference being had to the accompanying drawings, forming a part of this specification.

This invention has for its object to provide a machine which prepares directly from the wrapper and mouthpiece-paper a wrapper with mouthpiece ready for the reception of the tobacco.

Our invention consists in various combinations of devices hereinafter fully described, and pointed out in the claims.

This machine operates generally in the following manner: First a wrapper-tube is made and its edges joined by the usual wrapper-making devices. The finished wrapper-tube is cut by shears to the proper length. The shears move forward in the cutting, so as to make room for the succeeding wrapper-tube and to prevent upsetting or squeezing of the latter. The cut wrapper-tube is pushed in this moving of the shears to a conveying device which guides the wrapper-tube forward for the introduction of the mouthpiece and holds it during that operation, after which the finished tube, with mouthpiece, is acted on by devices which slightly unroll the mouthpiece to make it fit the wrapper-tube snugly and is then deposited into a box. The paper serving for the preparation of the mouthpieces is rolled upon a shaft and is in the shape of a strip of a width to correspond to the length of the mouthpiece. The paper is drawn off by rollers moving at stated intervals. Shears cut a piece of predetermined length off the paper-roll, and a small stamping apparatus strikes out simultaneously from the one corner of this paper piece a number of fringes, which are intended, instead of the usual triangle in the former mouthpiece-papers, to prevent the admission of the tobacco into the mouthpiece, as the fringes fold over with the subsequent rolling of the mouthpiece-paper. The cut and fringed mouthpiece-paper is then seized and rolled by a special device.

In order to prevent stuffing or choking of this device and a consequent interruption of operation, if a paper piece should be badly rolled or is not seized by the rolling mechanism this mechanism is provided with an ejector which throws out the badly-rolled paper pieces which project and are not seized by the rolling device. The properly-rolled mouthpiece is received by an introducing device and inserted into the ready-prepared wrapper-tube and then is acted on and conveyed to the box, as before briefly indicated.

In order that our invention may be readily understood and carried into effect, we will describe the same fully with reference to the accompanying drawings, (some of which are drawn on a smaller scale than others,) in which—

Figure 1 is a top plan view of an entire machine embodying this invention. Fig. 2 is a similar view omitting the parts used for making the mouthpieces. Fig. 3 illustrates the coupling of the driving-shafts. Fig. 4 is a section along the line 1 1 of Fig. 2. Fig. 5 is a section along the line 2 2 of Fig. 2. Figs. 6 and 7 are side front views, respectively, of the conveying device. Fig. 8 is a top view similar to Figs. 1 and 2 and shows in particular the parts used to form the mouthpieces. Fig. 9 is a section along the line 3 3 of Fig. 8. Fig. 10 shows the mouthpiece-shears from the front. Fig. 11 is a section taken on line 4 4 in Fig. 8. Fig. 12 is a view of a mouthpiece-paper. Fig. 13 is a top view of the ejector seen from the front. Figs. 14 to 21 represent details. Fig. 22 is a section along the line 5 5 in Fig. 8. Figs. 23 to 28 are views of further details.

No detailed reference is necessary to the parts of the machine used to make the wrapper-tube, since these may be of well-known construction, making either a crimped or pasted seam. The wrapper-paper is drawn off the roller 1, Figs. 1 and 2, by the presser-roll 2, Fig. 2. The latter is actuated in the following manner: The driving-shaft 6, Fig. 2, provided with the fly-wheel 3, the belt-pulley 4, and the loose pulley 5, is coupled with the shafts 7 and 8 in the manner shown in Figs. 2 and 3. The three shafts carry crank-sheaves 9 10 11 and crank-pins 12 13, on which the crank-rods 14, which are combined to form a triangle, are pivoted. The shaft 8 drives, by means of spur-wheels, the shaft 15 with the presser-roll 2, which, with a supporting device for the wrapper, draws the wrapper-paper along the dotted line in Fig. 2 from the roll 1 and pushes the wrapper-paper tube through the open wrapper-shears. The gear-wheel transmission from the shaft 8 to shaft 15 determines the length of the wrappers. The greater the transmission chosen the quicker will the roller revolve and the longer will the wrapper-paper tube be, which is pushed through the shears during one revolution of the driving-shaft 6.

*The cigarette-tube shears*, Figs. 4 and 5.—Referring now more particularly to Figs. 4 and 5, which illustrate the wrapper-shears, in the pillow-blocks 17 and 18, fixed at the lower part of the table-plate 16, Fig. 4, a rod 19 is adjustably journaled in its axial direction. This rod is pushed to the right once at every revolution of the shaft 6 by means of the piece 20, attached to said rod by means of screws, and by the roller 21, which presses against the cam 22 on the shaft 6. The rod 19 is drawn back by a spring 23, stretched between the pin 24, screwed into the plate of the table, and the holder 25, secured to the rod 19. The holder 25 carries a guiding-bolt 26, which slides with every movement of the rod 19 in a bore in the pillow-block 17 and prevents the rod 19 from revolving. The right extremity of the rod 19 terminates in a prismatic shoulder 27, on which the stand 28 for the shears is arranged. The blades 29 and 30 of the shears oscillate around the bolt 31 and are elastically pressed against each other by a set-screw with a spring. The legs of the shears are pressed by the spring 32 on the small spindles 33 34, Fig. 5, said spindles being attached to the slide-rod 36. The latter passes through the longitudinally-perforated shears-stand 28, through the shoulder 27 of the rod 19, and stands obtusely on the set-screw 37, which rests with its nut on the rack or oscillator 39, Fig. 4, and is held by the nut 40 with a spring. The oscillator 39 is pivoted around a bolt on the piece 20 and rests on the partially-flat flange-disk 41, keyed to the shaft 7. When the flat part of the disk 41 comes under the oscillator 39, the latter descends and with it the rod 36 and the small rollers 33 34, which slide away from the legs and enable the shears to snap together under the influence of the spring 32, Fig. 5. The shafts 6 and 7 are connected by the cranks and the crank-rod, Fig. 3. A revolution of the shaft 6 thus corresponds to one opening and shutting of the shears, while the eccentric 22 on the shaft 6 simultaneously pushes the shears back and forth once. After the wrapper-tube is cut its ends lie opposite the broad surface of the blade 30, and thus the movement of the shearing apparatus under the action of the parts described will move the cut wrapper-tube forward into position to be taken by the conveying apparatus now to be described and moved into position to receive the mouthpiece.

*The conveying apparatus*, Figs. 1, 2, 6, and 7.—From the shaft 6, Fig. 2, and by means of the spur-wheels 42 43 of the shaft 44, the bevel-wheels 45 46, the shaft 47, and the spur-wheels 48 the same speed is imparted to the shaft 49 as to the shaft 6. At the extremity of the shaft 49 is keyed the cam 50, Fig. 6, which reciprocates the sliding piece 52 in the frame 53 by means of the crank-rod 51. On the shoulder of the sliding piece 52 the journal 55 of the oscillator 56 is pivoted around the pivot 54. The oscillator 56 is supported with the spindle 57 on the cam 50. In order to maintain the spindle 57 and the cam 50 in steady motion, a spring is stretched between a pin on the oscillator or rocker 56 and a pin on the slide 52. By the action of the cam 50 and the slide 52 the rocker is given a twofold movement. The cam 50 revolves in the direction of the arrow, the sliding piece 52 moves to the right, and the oscillator follows in straight direction.

While the slide 52 travels back with the rocking arm 56 to the left, the eccentrical part of the cam 50 passes under the rocking arm, and the free extremity of the same describes an arc. The free left extremity of the arm 56, Figs. 2 and 7, carries the rod 58 with the forks 59 and 60, which are held by screws on the rod 58. The distance between the teeth of the forks is dependent upon the thickness of the wrapper-tube 61, Fig. 6, to be transported or conveyed. The teeth moving in an arc descend over the wrapper-tube. Immediately thereafter the wrapper-shears snap and the cut tube falls between the teeth of the forks onto the table 62. On this table a bow or bent piece 63 is screwed, on which around a bolt a second bow or bent piece 64 swings or pivots, said bow or bent piece being intended to hold the wrapper-tube while the mouthpiece is inserted. On the fork 60, Fig. 7, is the pin 65, which pushes itself (in the movement of the forks to the right) under the flange of the bow or bent piece 64 and so gradually raises it, Fig. 6. While the wrapper-tube 61 just cut moves while held between the teeth of the fork to the right the bow 64 is lifted from the preceding wrapper-tube 66, which has been provided meanwhile with the mouthpiece, and pushes it into the groove between the concave guide 67 and the cylinder 68. When the forks, or, rather, the sliding piece 52 with the rocking arm 56, has reached the extreme position to the right, the pin 65 on the fork slips forward under the flange of the piece 64. The latter falls and holds the wrapper-tube which has been inserted while the forks recede and descend anew over another wrapper-tube. The wrapper-tube 66, which has been pushed into the groove between the cylinder 68 and the concave guide 67, is rolled along the groove by the fluted cylinder 68, slightly pressing it and unrolling the mouthpiece, thus making the latter fit snugly the wrapper-tube, and is then delivered to the box for finished wrapper-tubes with mouthpieces. Thus the wrapper-tubes with mouthpieces are given a good cylindrical form. They are pushed into the box or receptacle by the noses 70 on the cylinder 68.

*Device for moving the mouthpiece-paper,* Figs. 8 and 9.—We will refer now to Figs. 8 and 9, which illustrate the device for moving the mouthpiece-paper. From the shaft 6, Fig. 8, and by means of the spur-wheels 42 43, the shaft 44, the bevel-wheels 45 46, the shaft 47, and the spur-wheels 48, the middle one of which is secured to the shaft of the cylinder 71, the latter is turned in the direction of the arrow, Fig. 9. Above the cylinder 71 is the cylinder 72, Fig. 9, which is pressed by screws against the cylinder 71. On the cylinder 71 is fixed the ring-piece 73, extending only a part of the way around its periphery. The mouthpiece-paper strip comes from the spool on the carrier under the table in the direction of the arrow along the hatched line, Fig. 9, over the cylinders 75 76 77, through the guide-rails 78, the stamping apparatus 79, the guide-rails 80, and between the cylinders 71 and 72. As long as the ring-piece 73, the surface of which is fluted, rolls on the upper cylinder 72, the mouthpiece-paper is carried along by the cylinder 71 and pushes forward a distance equal to the length of the ring-piece. When the ring-piece 73 has passed the upper cylinder 72, the paper strip is stopped in the free space between the cylinders, and it remains motionless until the ring-piece again contacts from the other side under the cylinder 72. The ring-piece 73 determines the length of the piece to be cut off the mouthpiece-paper strip. The more the ring-piece takes hold of the roller 71—that is to say, the longer it is—the greater will be the length of the piece of mouthpiece-paper strip pushed through the open mouthpiece-shears with every revolution of the cylinder 71. In the graduated movement of the paper strip in the machine the unwinding from the spool would ordinarily be in jerks or gradually, which might cause slipping or tearing of the paper strip. This is prevented in the following manner: From the shaft 40, Fig. 8, the shaft 82 is driven by the bevel-wheels 81, and by the bevel-wheels 83 the shaft 84, on which is the cylinder 75, Fig. 9, which is intended to unwind the paper strip from the spool at a uniform speed and to feed it to the weighed loop, and in order that the paper may be properly carried along by the cylinder 75 the latter is corrugated. The paper strip is pressed down by the cylinder 76 and the bar 85. The cylinder 76 revolves in the journal-sockets 86 87, Fig. 8, which hang loosely on the axle of the roller 77. The spring 89, Fig. 9, catches on the stay or bridge 88, connecting the journal-sockets 86 and 87, said spring pressing the journal-sockets with the cylinder 76 against the cylinder 75. 90 is a ring on the roller 77, Fig. 8, which is adjusted in accordance with the width of the paper strip, and which, together with the guide-rail 80, prevents the slipping of the paper strip to the right. 91 is a guide-rail in front of the mouthpiece-shears. 92 is also a guide-rail in front of the rolling device. 93 is the movable and 94 the stationary shear-blade of the mouthpiece-shears. 95 is the rail, which holds the paper on the stamping apparatus. 96 is the frame of the latter; 97, the screw-bolt, which holds the frame 96 on the table-plate 16.

*The mouthpiece-shears.*—We will now describe the mouthpiece-shears. (Illustrated in Figs. 8 and 10.) The mouthpiece-shears consist of the movable shear-blade 93, keyed on the shaft 98, Fig. 10, and the stationary blade 94, screwed on the plate 99. 100, Fig. 8, is the journal or bearing of the shaft 98. 101 is a sleeve on the latter, which carries the lever with the roller 102. By means of a spring the lever is pulled to the left and the shears opened. The roller 102 on the lever presses against the sheave 104 on the shaft 47, Fig. 8, said sheave being provided with a boss 103.
With each revolution of the shaft 47 the boss 103 on the sheave 104 pushes the lever to the right, Fig. 10, and thus shuts the shears. On the movable blade 93 the bent finger 105 is screwed. The latter lies normally under the mouthpiece-paper strip and again lifts up the mouthpiece-paper strip, which has been pressed down by the movable blade 93 of the shears, when the latter closes, so that said paper can pass smoothly in its advance over the blade 94 on the plate 99. The shears-blade 93 is fastened on the shaft 98, Fig. 8, by means of a screw which engages in the groove of the shaft, whereby the revolution of the blade 93 around the shaft is prevented.
By means of the spring 106 on the cylinder-frame, Fig. 8, the shaft 98 with the blade 93 of the shears is pressed against the blade 94 on the plate 99. The mouthpiece-shears is adjustable in the direction of the paper strip, so that longer or shorter strips can be cut off. The stationary blade of the shears is adjusted with the plate 99 by means of the screw-spindle 107, Fig. 8, which revolves in bearings on the working table and engages in the threaded bore 108, Fig. 10, in the plate 99, and it is fastened by the screw 109 on the table. The movable blade of the shears is pushed along the groove of the shaft 98 and adjusted therein, Fig. 8, after its attachment-screw has been loosened.

*The stamping apparatus.*—The stamping apparatus consists of a series of stamps 111, fastened by bolts, Fig. 11, on the frame 96, between which the movable stamps 113 swing or pivot around the bolt 112. The stamps 113 are connected with the fork on the rod 115 by the bolt 114. The rod 115 has a link 116 and is adjusted by the nuts 117 and 118 on the angle-lever 119. 16 is the table leaf or plate. 120 is the pivot of the lever 119. 121 is a roller on the right arm of the same, which presses against the cam 122 on the shaft 6. The left lever-arm and therewith the rod 115, with the stamps 113, are pulled down by two springs 123, which are fastened in turn on the rod 115 and on the machine-frame. In Fig. 11 only the rear spring is visible. With each revolution of the shaft the cam 122 pushes the right arm of the lever 119 down, whereby the left arm, with the rod 115, ascends and strikes the stamps 113 down. The upper stamps cut out from the paper strip and press down a series of paper striplets or fringes, as 124, Fig. 12, and in order that these may not be caught or stopped between the fixed stamps 111, Fig. 11, and so impede the advance of the paper strip 125 notches 126 are provided in the stamps 111 in order that in the advance of the paper strip 126 the fringes 124, which have been pressed down, pass into the notch or cut-out 126 under the upper surface of the stationary stamps 111. The fringes, Fig. 12, must always be at that side of the mouthpiece which is seized by the rolling apparatus, so that they lie in the interior of the mouthpiece when formed. They must also begin at the edge, so they are not rolled in and entirely or partially covered by the turned-over mouthpiece-paper. The stamping apparatus must consequently be capable of very precise adjustment with regard to the rollers 71 and 72, Fig. 9, so that the mouthpiece-paper shears cut over the mouthpiece immediately in front of the fringes. To permit of this, the frame 96 can be displaced on the table in the direction of the paper strip, the movable stamps 113, Fig. 8, shifting on the bolt 114 of the fork 127, while the actuating mechanism remains stationary.

*The device for rolling the mouthpieces*, Figs. 8, 9, and 14 to 28.—Referring now to the device for rolling the mouthpieces, (shown in Figs. 8, 9, 14 to 28,) the spur-wheels 131, 132, and 133 are actuated by the shaft 6, Fig. 8, and the spur-wheels 42 and 43, the shaft 44, the bevel-wheels 45 and 46, the shaft 47, the spur-wheels 128 129, and the shaft 130. The transmission from the spur-wheel 131 to the spur-wheel 133 is so calculated that the spur-wheel 133 revolves about fifteen times quicker than the driving-shaft 6. The prolonged axle of the spur-wheel 133, Fig. 22, carries the coupling 134, which is movable on the axle, and this coupling when in connection rotates the rolling device. The part of the apparatus which rolls up the mouthpiece consists of the small slotted tube 135, Fig. 14, which is inserted into the tube 136, Fig. 15, and is fastened by a screw. Within the tube 135 and 136, Figs. 8 and 22, is the spindle 137, Fig. 16, which is grooved to a considerable length and which carries at the edge of the groove the points 138. When at rest, the tubes 135 and 136 and the spindle 137 have the position shown in Fig. 20 in transverse section. The groove of the spindle coincides with the slot of the tube 135, and the mouthpiece-paper 125 projects into both. When the coupling is engaged, it first turns the spindle alone by ninety degrees, (in the tubes 135 and 136.) As a consequence the edge of the groove of the spindle presses the mouthpiece-blank against the interior wall of the tube 135, Fig. 21, and the points 138, Fig. 16, at the rim of the groove press into the paper. Thus the mouthpiece-paper is seized by the rolling device and held during the rolling process. When the coupling is disengaged, the spindle 137 is arrested a quarter-revolution before or earlier than the tube 135. Thereby the groove of the spindle 137 returns in front of the slot of the tube 135, the apparatus thus releasing the rolled mouthpiece and is back at the resting position, Fig. 20, in which it remains until the introducing device has taken off the mouthpiece and the rollers 71 72, Fig. 9, have pushed forward a length of paper for a new mouthpiece. The tube 136 revolves in the bearings 139 and 140, Figs. 8, 22, and 25, on the rails 141 and 142 and carries the sleeve 143 with the shoulders 144 and 145, Figs. 15 and 18. On the spindle 137 is keyed the tappet-holder 146, having a head 156, Fig. 17. When at rest, both are as represented in Figs. 1, 8, 19, 22, and 25—viz., Figs. 1, 8, and 25 seen from above, in Fig. 22 from the side, and in Fig. 19 from the front.

The coupling 134 first strikes and turns the tappet 146 in the direction of the arrow, Fig. 19, and presses it against the shoulder 145 of the sleeve 143, thus carrying along the sleeve 143 only after a quarter-revolution, during which latter the mouthpiece-blank is seized by the teeth 138 on the spindle 137 and one wall of the slot in the tube 135.

The engagement and disengagement of the coupling 134 is effected by means of the lever 147, Figs. 8, 25. The lever 147 moves around the pivot 148 and carries on its upper arm the pin 149, which engages in a groove in the coupling or clutch 134, Figs. 22, 25, and pushes it reciprocally on its axle, engaging and disengaging it, respectively. The lower arm of the lever 147, Figs. 1 and 8, is pulled to the right by a spring and presses, with the roller 150, against the stroke or lever-lifting disk 151 of the shaft 130. As long as the roller 150 slides upon the boss of the disk 151 the clutch or coupling is disengaged. On the further revolution of the disk 151 the roller 150 is drawn off the boss by the spring and the lever is reversed and presses the clutch into engagement. On the lever 147 are the brake 152 and the spring-pressed finger 153, Figs. 1, 8, and 25. On the brake 152, Fig. 22, are cut out the steps 154 and 155. In accordance with the position of the brake the shoulder 144 and the tappet 146 move past the corresponding steps or are arrested by the same. While the clutch is disengaged, the brake 152, Fig. 19, catches the tappet by the head 156 of the tappet striking the step 154, while the shoulder 144 of the sleeve 143 is against the brake 152 and is held by the spring-pressed finger 153. At the proper time in the revolution of the disk 151 the boss thereon passes by the roller 150 and the spring begins to move the upper arm of the lever 147 to the left, thus moving the coupling 134 and the step 155 of the brake 152 to the left, which slides along the shoulder 144 for a short distance, the brake moving far enough to release the tappet 146 from the step 154. The clutch 134 at this time strikes the tappet 146 and moves it about ninety degrees until it strikes the shoulder 145 of the sleeve 143, at which time through the further movement of the brake 152 to the left the shoulder 145 is released from the step 155, the mouth piece-blank being at this time seized, and as the spindles 137 and 135 are rotated together the blank is wound on the tube 135, being guided by the adjustable guide-rail 92 in front of the rolling device. As soon as this winding is completed the boss on the disk 151 moves the lever 147 against the spring and with it the brake 152 to the right, when the head 156 of the tappet 147 strikes the step 154 and is arrested thereby. The further movement of the brake 152 to the right then brings the step 155 in front of the shoulder 144, arresting the same, with the tube 135, the spring-finger 153 snapping behind such shoulder, as shown in Fig. 28, and preventing a jumping or return movement thereof. The rolling device is thus arrested with the groove 138 in the spindle 157 in the position opposite the slot in the tube 135 and then held for the reception of a new mouthpiece-blank.

*The ejector*, Figs. 8, 9, and 13.—The ejector mechanism consists of a lever 159, provided on the one end with the teeth 157, Fig. 13, and on the other with roll 158. The lever pivots around the pin 160 in the journal 161, which is screwed on the rail 142, Fig. 8. The lever-arm, with the roller 158, is pulled downward by a spring, Fig. 13, and the roller is pressed upon the cam 163 on the shaft 44. At each revolution of the shaft the cam throws over the lever once by its stroke, while the mouthpiece-paper disappears in the rolling apparatus, so that if a mouthpiece is imperfectly seized or not at all the lever 159 tears out the mouthpiece from the rolling apparatus and throws it through a hole in the plate 16 of the table. Teeth 157 are provided, so that the ejector does not slide off on the paper.

*The introducing device*, Figs. 8, 14, and 22 to 24.—While the mouthpiece is being rolled, the introducing-tube 164, Fig. 23, moves over the little tube 135, Figs. 14, 22 to 24. This tube 164 is slotted, so as to pass over the mouthpiece-blank as it is being rolled and to permit the operation of a stripping device, and one end is inclined and pointed, so as to readily enter the wrapper-tube to introduce therein the rolled mouthpiece. The rolled mouthpiece stretches or extends after it has been released by the rolling device like a spiral spring and presses against the interior wall of the introducing-tube. The introducing-tube 164, Figs. 8, 22 to 24, is keyed on the sliding piece 165, which moves on and between the rails 141 142 and which is represented in section in Fig. 22. This introducing-tube is connected by the rod 166 with the support or carrier 167 and the crank-pin 168 and the crank-rod 169 with the crank-disk 170 on the shaft 7, being reciprocated by the same. The support 167 is keyed on the rod 171 by the screw 172, the rod sliding in the journals on the machine-frame and serving for the guiding of the carrier 167. Within the sliding piece 165 is a pivoted nose or shoulder 173, which is pressed by a spring 174 against the small tube 135. 175, Fig. 8, is a spring-pawl pivoted on a stationary pin and projects into the slot of the introducing-tube 164. When the tube 164 moves toward the wrapper, (to the left of Figs. 1 and 8 and to the right of Fig. 22,) the shoulder or nose 173, Fig. 22, pushes the mouthpiece in the introducing-tube against the pawl 175, Fig. 8. The mouthpiece lifts the pawl and the latter slides along on the same, slipping behind the mouthpiece into the slot of the introducing-tube 164, and during the operation the narrowest end of the introducing-tube enters the wrapper-tube and pushes it into the angle 176 on the table 62, which causes the wrapper to lie over parallel to the introducing-tube. The wrapper-tube is pushed against the angle 176 and glides upon the introducing-tube. The latter now carries the wrapper on the outside and the mouthpiece on the inside. When the introducing apparatus recedes, the mouthpiece in the tube 164 first strikes against the pawl 175, Fig. 8, and is arrested, as is also the wrapper-tube, permitting the introducing-tube to withdraw from over the mouthpiece and from within the wrapper-tube. After the introducing-tube has withdrawn from between the wrapper-tube and the mouthpiece the mouthpiece-paper extends somewhat and presses against the interior wall of the wrapper. On the table 62 a notch is provided, so that the sliding piece 165, Fig. 24, can move sufficiently far to the right. This notch is closed by the flap 178, Fig. 8, screwed on the oscillator or swing 179, Fig. 24, which pivots around the pin 180 and is pressed upward by a spring until a slot of the swing or oscillator strikes with its lower extremity against the screw 181—*i. e.*, when the surface of the flap 178 and the tables 62 are on a level. On the slide 165 is the pin 182, which slides on the upper edge of the swing 179 and either presses it down and lowers the flap 178, Fig. 24, or allows it to move up and close the notch or cut-out in the table 62. The sheet-metal angle 183 is arranged on the flap, serving as partition for the purpose of preventing the wrapper-tubes, which tend to jump aside by the quick extraction of the introducing-tube, from jumping the cam 175, but cause them to be pushed by the forks of the conveying apparatus regularly against the roller or cylinder 68.

The operation of the machine is as follows: When the machine is started, either by means of the handle on the fly-wheel 3, Fig. 1, or by laying on the strap on the pulley 4, the presser-roll 2, with a supporting device for the wrapper, pulls the wrapper-paper from the spool 1 and pushes the finished wrapper-paper cylinder through the open wrapper-shears 29 30. At the same time the mouthpiece-paper is pulled into the machine by the rollers 71 and 72 from the spool under the table and pushed across the table, through the stamping apparatus, through the open mouthpiece-shears, under the ejector, and into the rolling device 135 and 137. During the same time in which the wrapper-shears cut a wrapper the mouthpiece-shears cut a mouthpiece, which while the wrapper before the conveying device is brought under the bow 64 is seized at once by the rolling device and disappears over the tube 135 into the introducing-tube 164, moving over the tube 135. While the introducing-tube 164 conveys the rolled mouthpiece into the wrapper-tube the wrapper-paper cylinder has almost passed the length of one wrapper through the shears and the mouthpiece-paper has again advanced by one piece, so that the introducing apparatus recedes while the wrapper-shears again cut a wrapper and the mouthpiece-shears cut the corresponding mouthpiece. The wrapper-paper tube is uninterruptedly advanced. The mouthpiece-paper is periodically advanced rapidly the length of one mouthpiece and then remains stationary for a short time. During the pause the stamping apparatus strikes out fringes into a mouthpiece-paper and the mouthpiece-shears cut off a mouthpiece. As the shears are stationary, a smooth cut would not be possible during the movement of the paper strip, and, moreover, an interruption or pause becomes necessary to bring the movement of the mouthpiece-paper into accord with the rolling and introducing device, so that the ejector can throw aside a spoiled mouthpiece without striking the succeeding mouthpiece. Only after the cut-off mouthpiece has either been rolled or cast aside and the introducing-tube has advanced or traveled ahead, either with a properly-rolled mouthpiece or empty, the rollers 71 72 advance the paper strip again the length of one mouthpiece. The advancing or arriving mouthpiece thus finds the rolling apparatus open in every case, for either the ejector or the introducing-tube has removed the preceding mouthpiece. The conveying apparatus places the wrapper-tube before the introducing-tube in such a manner that the point of the introducing-tube almost enters right into the middle of the wrapper. It is immaterial in this relation whether the wrapper is displaced, whether it rolls obliquely, or more or less to the right or left. It is sufficient if the point of the tube 164 strikes in the wrapper-tube. While the tube, with the mouthpiece, penetrates into the interior of the wrapper it pushes the same ahead into the angle 176. The wrapper-tube adjusts itself automatically in the operation. After the introducing-tube has moved the wrapper-tube on the table 62 the mouthpiece is pushed in, and the mouthpiece is then at the interior of the wrapper, together with the introducing-tube. In the return movement the introducing apparatus conducts the wrapper out again from the angle 176 and the pawl 175 takes it off from the tube, with the mouthpiece. In the meantime the forks or teeth of the conveying apparatus approach with an empty wrapper-tube and push the finished one, which has been pushed off the introducing-tube, before the cylinder 68, which conveys it into the receiver 69, in which the finished wrappers are gathered.

With the exception of the devices serving for the manufacture of the wrapper-cylinder the individual apparatus of the machine work periodically in such a manner that after each complete revolution of the fly-wheel 3 or the shaft the cycle of movement is renewed. Thus a wrapper-tube with mouthpiece is made ready and laid off with each movement during said operation.

Having fully described our invention, what we claim as new, and desire to secure by Letters Patent, is—

1. The combination of means for rolling up mouthpieces and means for holding wrapper-tubes, with means for receiving the rolled-up mouthpieces and introducing them into wrapper-tubes, and means acting while another mouthpiece is being rolled up to return such receiving and introducing means into position for the reception of a mouthpiece, substantially as described.

2. The combination of means for rolling up mouthpieces and means for holding wrapper-tubes, a slotted reciprocating tube for receiving the rolled-up mouthpieces and introducing them into wrapper-tubes, stripping means by which the rolled-up mouthpieces are stripped from the rolling-up means and the wrapper-tubes and inserted mouthpieces are stripped from the receiving and introducing means, substantially as described.

3. The combination of means for rolling up mouthpieces, means for feeding mouthpiece-blanks thereto, means for holding wrapper-tubes, means for receiving the rolled-up mouthpieces and introducing them into the wrapper-tubes, and means acting while a mouthpiece is being rolled up to return such receiving and introducing means into position for the reception of a mouthpiece, substantially as described.

4. The combination of means for advancing a mouthpiece paper strip to means for rolling up mouthpieces, means for cutting off mouthpiece-blanks from such strips, means for rolling up said blanks, means for holding wrapper-tubes, and a reciprocating mouthpiece-feeding device advancing with the mouthpiece into the wrapper-tube, substantially as described.

5. The combination of means for rolling up mouthpieces and means for holding wrapper-tubes, with a tube having an inclined end, adapted to receive the rolled-up mouthpieces, and means for reciprocating the tube to carry the mouthpieces into wrapper-tubes, substantially as described.

6. The combination of means for rolling up mouthpiece-blanks, means for holding wrapper-tubes, a reciprocating slotted introducing-tube with inclined end, a movable shoulder, operating therewith to strip the rolled-up mouthpieces from the rolling-up means as the introducing-tube advances, and a pawl to strip the rolled-up mouthpieces and wrapper-tubes from such introducing-tube as the tube is retracted, substantially as described.

7. The combination of a slotted tube, means for rotating the same, means within such tube moved independently of the same for seizing and releasing the mouthpiece-blanks, means for holding wrapper-tubes, means for removing the rolled-up mouthpieces from such tube and introducing them into the wrapper-tubes, and means acting while a mouthpiece is being rolled up to return such receiving and introducing means to position for the reception of a mouthpiece, substantially as described.

8. The combination of a slotted tube, a grooved spindle within the same, means for rotating said tube and spindle together, means for rotating such spindle relatively to such tube to seize the mouthpiece-blanks and release them, and means for removing the rolled-up mouthpieces and introducing them into the wrapper-tubes, substantially as described.

9. The combination of a slotted tube, a grooved spindle within the same, means for moving such spindle relatively to such tube, and for rotating the two together, to seize the mouthpiece-blanks, roll them up, and release them, and means for removing the rolled-up mouthpieces and introducing them into the wrapper-tubes, substantially as described.

10. The combination of a slotted tube 135 having shoulders 144, 145, a grooved spindle 137 within the tube 135, having a tappet 146 adapted to engage the shoulder 145, a revolving clutch member 134 adapted to engage the tappet 146, and a movable brake 152 having stops 154 and 155 for engaging the shoulder 144 and the tappet 146 respectively, substantially as described.

11. The combination of means for feeding mouthpiece-blanks and means for rolling up mouthpieces, of a guide-rail having an inclined guiding-face in front of such rolling-up means, substantially as described.

12. The combination of means for feeding mouthpiece-blanks and means for rolling up mouthpieces, with an adjustable guide-rail having an inclined guiding-face, in front of such rolling-up means, substantially as described.

13. The combination of means for fringing one end of mouthpieces and bending tongues of said fringe, with means for rolling up said mouthpieces with the bent tongues extending inwardly, substantially as described.

14. The combination of means for holding wrapper-tubes and means for fringing one end of mouthpieces and bending tongues of said fringe, with means for rolling up said mouthpieces with the bent tongues extending inwardly and means for introducing them into wrapper - tubes, substantially as described.

15. The combination with means for rolling up mouthpieces, of a plurality of stationary stamps, with a plurality of movable stamps, acting therewith to cut out and press down a plurality of fringes on mouthpiece-blanks and means for feeding the mouthpiece-blanks from the stamps to the rolling means, substantially as described.

16. The combination with means for rolling up mouthpieces, of a plurality of stationary stamps, with a plurality of movable stamps acting therewith to cut out and press down a plurality of fringes on mouthpiece-blanks and a recess to permit such blanks, after the fringes have been made, to be advanced without injury to such fringes and means for feeding the mouthpiece-blanks from the stamps to the rolling means, substantially as described.

17. The combination with means for rolling up mouthpieces, of an ejector for removing a mouthpiece - blank not properly caught or rolled up by the rolling-up means, out of the way of the next mouthpiece-blank, substantially as described.

18. The combination with means for rolling up mouthpieces, of means for advancing the mouthpiece-blanks to the rolling-up means, and an ejector, substantially as described.

19. The combination of means for forming a continuous wrapper-tube from a web of wrapper-paper, means for severing from the continuous tube, wrapper-tube sections of the desired length, and moving the same into position for the introduction of rolled-up mouthpieces, means for rolling up mouthpieces, and means for receiving and introducing such mouthpieces into such wrapper - tubes and means acting while a mouthpiece is being rolled up, to return such receiving and introducing means into position for the reception of a mouthpiece.

20. The combination of means for forming a continuous wrapper-tube, means for severing from the continuous tube, wrapper-tube sections of the desired length, and moving the same into position to be acted on by reciprocating conveying means, such reciprocating means for moving the cut-off wrapper-tubes into position for the insertion of the rolled-up mouthpieces, and means for inserting the mouthpieces in the wrapper-tubes, substantially as described.

21. The combination of means for forming a continuous wrapper-tube, means for severing from the continuous tube wrapper-tube sections of the desired length, and reciprocating means for moving the cut-off wrapper-tubes transversely into position for the insertion of rolled-up mouthpieces, and means for inserting the mouthpieces, substantially as described.

22. The combination of reciprocating means for moving wrapper-tubes transversely into position for the insertion of the rolled-up mouthpieces, and for holding the same in position while such mouthpieces are inserted, and means for inserting the mouthpieces, substantially as described.

23. The combination of vibrating forks 59, 60 for moving wrapper-tubes transversely into position for the insertion of rolled-up mouthpieces, a movable holding-piece 64 for holding the tubes in position, a stationary piece 63, and an angle 176 for positioning the end of the tube and means for inserting the mouthpieces, substantially as described.

24. The combination of means for feeding wrapper-tubes with rolled mouthpieces therein with a concave guide and a cylinder coacting therewith to slightly unroll the mouthpieces, substantially as described.

25. The combination of a concave guide, and a cylinder for coacting with the concave guide to slightly unroll the mouthpieces, with means for feeding wrapper-tubes with rolled mouthpieces therein, said cylinder having noses 70 projecting from the surface thereof, substantially as described.

26. The combination of means for conveying wrapper-tubes, means for forming a continuous wrapper-tube from a web of wrapper-paper, and shears having blades 29, 30, for severing from the continuous tube, tube-sections of the desired length, and means for moving the shears sidewise, the blade 30 having a broad surface to move the cut wrapper-tube into position to be acted upon by the conveying means, substantially as described.

27. In a machine for making cigarette-wrappers with mouthpieces, the combination of a mouthpiece-forming device, means for fringing one end of said mouthpiece, a conveyer for moving said wrapper, cutting means for cutting the wrappers to size, a second conveyer, and a mouthpiece-introduction device, said second conveyer carrying the wrapper to the introduction device and subsequently out of the machine, substantially as described.

28. In a machine for making cigarette-wrappers with mouthpieces, shears for cutting off the wrapper, one blade of the shears being broadened and adapted to afford a bearing against the end of the cut wrapper and means for moving the shears in a direction longitudinally of the cut wrapper, substantially as described.

29. In a machine for making cigarette-wrappers with mouthpieces, means for cutting the wrappers, a conveyer comprising an oscillating arm having forks to seize the cut wrapper, means for giving the said arm an oscillating and a reciprocating motion, a guide to which the said conveyer carries the cut wrapper and means for introducing the mouthpiece to said wrapper, substantially as described.

30. In combination in a cigarette-machine, means for feeding the mouthpiece-paper, means for fringing the same and means for rolling the fringed papers, substantially as described.

31. In combination in a machine for making cigarette-wrappers means for feeding the mouthpiece-paper, means for fringing the same and means for rolling the fringed papers, said fringing means being adjustable and consisting of a number of stationary knives and movable knives coöperating therewith, substantially as described.

32. In a machine for manufacturing cigarette-wrappers with mouthpieces, a device for rolling the mouthpiece-paper, consisting of a tube with a longitudinal slot which receives the paper, a toothed quickly-revolving spindle arranged in said tube, for seizing the paper in the tube and rolling same, and a clutch or coupling with means for operating the same automatically, substantially as described.

33. In a machine for manufacturing cigarette-wrappers with mouthpieces, the plate having an opening a device for ejecting the defective mouthpiece-papers, said device consisting of a toothed lever, and means for operating the same whereby said lever strikes down upon the unrolled paper to eject it through an opening in the plate of the machine, substantially as described.

34. In a machine for manufacturing cigarette-wrappers with mouthpieces, means for forming the mouthpiece a device for the insertion or introduction of the mouthpiece into the wrapper, consisting of a laterally-slotted tube, to receive the mouthpiece-paper on its inside and to penetrate into the wrapper, and a cam or finger which catches into the slot of the tube at its return movement and pushes the wrapper and the mouthpiece off the tube so that the mouthpiece remains inserted in the wrapper, substantially as described.

35. In combination the slotted tube, the slotted spindle within the same, means for giving independent rotary movement to said parts and means for feeding the paper to the parts, substantially as described.

36. In combination with means for holding the wrapper, a slotted introduction-tube, means for forming the mouthpiece and operating means whereby the mouthpiece is transferred from the forming means to the interior of the introduction-tube and from here into the wrapper which the introduction-tube is adapted to enter, substantially as described.

37. In combination, the means for rolling the paper, and an ejecting device operating adjacent to the said rolling means to engage the paper when left projecting from said rolling means due to defective rolling, substantially as described.

38. In a machine for making mouthpieces for cigarettes, the combination of means for producing teeth or serrations at one edge of a piece of paper, means for bending up said teeth and means for rolling said paper to form a mouthpiece with said teeth projecting into its interior.

In witness whereof we have hereunto set our hands in presence of two witnesses.

SRUL DAVID S. RAKOWITZKY.
 SELMAN S. D. RAKOWITZKY.

Witnesses:
 ERNST F. GUTSCHOW,
 WILLIAM LOWELL.